Patented July 20, 1926.

1,593,342

UNITED STATES PATENT OFFICE.

JOSEPH V. MEIGS, OF JERSEY CITY, NEW JERSEY.

DEHYDRATED CARBOHYDRATE-PHENOLIC RESINOUS PRODUCTS AND PROCESS OF MAKING SAME.

No Drawing.   Application filed November 30, 1925. Serial No. 72,398.

The present invention relates to processes of dehydrating carbohydrates in the presence of aromatic, i. e. benzene and napthalene, derivatives, and other bodies and products produced as a result of such processes, more particularly resinous products, all as will be more fully hereinafter described and claimed.

The aromatic derivatives referred to are preferably the hydroxyl and (or) amino derivatives and their homologues, as for example, phenol and its homologues and the naphthols and their homologues; also aniline and the naphthylamines and their homologues.

The carbohydrates employed are preferably monoses, e. g. hexoses or pentoses, or substances which may readily yield the same, e. g., sucrose, maltose and other disaccharides. The invention is, however, not restricted to the use of monoses, and may employ other suitable carbohydrates or their equivalents which yield monoses, e. g., starch, molasses, etc.

In its preferred form, the invention deals with reactions between hexoses and phenols, and it has been found that suitable manipulation of such materials leads to the production of substantially anhydrous resinous bodies adapted for use in the preparation of hard, inert shaped articles, which may be of so-called infusible, or heat-setting type.

The prior art discloses numerous examples of resinous bodies produced by the interaction of phenols and carbohydrates in the presence of acid catalysts. It does not, however, disclose a reaction resulting in the splitting off of water from the sugar or carbohydrate molecule nor any method for producing an anhydrous stable resin, nor does it disclose any process for controlling the reaction so that a definite quantity of phenol may be combined with such dehydration products, nor does it disclose the influence on the reactions of the proportion of catalysts or reaction promoting bodies.

The present invention is especially concerned with the production of molding compounds for use in the manufacture of hot-pressed molded articles. Such compounds are commonly composed of a synthetic resin of one kind or another, a hardening agent therefor, and a so-called filling material.

To be of commercial value such compounds must possess known molding properties, including a definitely known "shrinkage". Molded articles must often be produced possessing exact dimensions, within a possible deviation of two or three thousandths of an inch. The unavoidable shrinkage of molding compounds can be allowed for, if small and uniform, by making the mold, say, several thousandths of an inch larger, in each dimension, than the finished product.

Obviously, the volatile products, particularly water, given off by molding material in the mold should be, first, as small as possible in proportion, and secondly, that proportion should be uniform.

Having disclosed that the production of resinous material from carbohydrates and phenols (or other substances as shown) is accompanied by the evolution of water and that some of this water is released from the carbohydrate molecule, the present invention goes still further and shows how this evolution of water may conveniently be carried out and completed, the water eliminated, and the reaction thus controlled to yield a resin with an extremely small or negligible and uniform water content, i. e., a substantially anhydrous resin, which will not evolve any considerable amount of water during a molding operation.

The prior art discloses that acids, particularly mineral acids, may be used as catalysts but does not show in what proportions these must be used in order to obtain strictly controllable results. The present invention makes this disclosure.

The present invention deals therefore especially with methods for controlling the elimination of water from carbohydrates and particularly sugars in the presence of phenols to yield anhydrous resins. In the preferred form of the invention, these resins are of the fusible type, or slow-reacting type, i. e., capable of slowly hardening when heated, and may be incorporated with hardening agents, particularly those of the methylene type, to yield compounds that will harden very quickly, when heated, to an infusible condition.

The present invention also discloses that the anhydrous products of hexoses possess certain combining power for phenols. The following examples will show how the invention may be practiced:

*Example 1.*—The apparatus consisted of a glass column still (glass flask) with a capacity of one and one-half liters, provided with an air-cooled distilling or dephlegmating column, about 26 inches high and five-sixteenths of an inch in diameter in the form of a glass tube, and a water-cooled condenser leading from the top of the air-cooled condenser.

600 grams phenol were melted and placed in the still. Five grams of concentrated sulphuric acid (specific gravity 1.84) was added and the whole heated to 130° C. 500 grams Argo corn sugar containing about 84.1% dextrose were gradually added and dissolved by heating. Heating was continued. Ebullition occurred at 126° C., and fractional distillation then took place, that is, water and phenol were evolved. By means of the column or dephlegmator, water distilled over and was collected at the end of the water-cooled condenser, while most of the phenol refluxed back into the still.

During the first hour, the temperature of boiling owing to rapid water elimination, rose from 126° C. to 175° C. and during the following two hours from 175° C. to 180° C. At the end of this time, 220 cc. of aqueous distillate were collected, and distillation was discontinued, inasmuch as the distillation of water had become very slow, showing that the reaction had, for practical purposes, attained equilibrium. The residue consisted, apparently exclusively, of a resinous substance and free phenol.

8 grams of stearic acid were added to the resinous residue in the flask, to serve as a mold "lubricant" in the subsequent molding operation and then vacuum distillation was employed to remove excess phenol.

164 grams of excess phenol were recovered by vacuum distillation, and the residue in the flask, on cooling, solidified to a black, solid resin, capable of being easily pulverized to a powder. It was soluble in alcohol. When heated it yielded a viscous, liquid mass, and belongs to the type of fusible, or slow-hardening resins, and is substantially anhydrous.

The evolution of water as above described has been found to afford a very important and convenient means for following the progress of the reaction. This distillation of water should be continued until it is as nearly complete as practicable. Otherwise, the resin, when heated in molds will evolve water and suffer undue shrinkage as well as porosity. Moreover, such evolution of water, in a mold, will cause "blistering" of the molded article and thus render it commercially valueless.

The quantity of water evolved, as shown in example 1, corresponds to that which would theoretically be produced by the dehydration of the dextrose, with the removal of three molecular weights of water from each molecular weight of dextrose, and the consequent production of hydroxymethyl furfural, together with the condensation of each molecular weight of the latter with two molecular weights of phenol, as shown by the following equation:

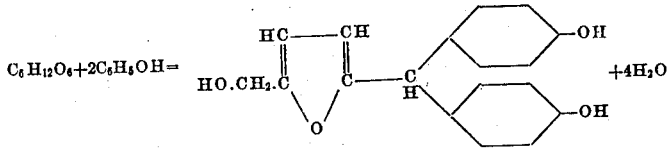

The 500 grams of sugar employed contained 420 grams of dextrose or 2.33 mols. According to the above equation, this quantity of dextrose should, in reacting with phenol as shown, evolve 9.32 mols. of water or 167.8 grams. The 500 grams of sugar also contained 11% of "moisture", consisting largely of water of crystallization, or 55 grams. This added to the amount produced by chemical reaction equals 223 grams.

Actually, 223 grams were obtained in the example shown above.

Moreover, according to the above equation, 4.66 mols. of phenol or 438 grams, should combine with 2.33 mols. of dextrose with elimination of 9.32 mols. of water. Actually 436 grams of phenol were combined or retained, as shown by the difference between the quantity of phenol used (600 grams) and that recovered by distillation (164 grams).

This equation therefore seems to express pretty closely the nature of the changes involved in the dehydration of a mixture of hexose and phenol in the presence of an acid catalyst. As will subsequently be stated, a similar change occurs, apparently, when a basic catalyst, e. g. aniline, is employed although the solubility of the product produced in this way differs from that produced when an acid catalyst is employed. The hardening of this resinous product may be brought about by heating, probably through polymerization and further condensation, or by reaction of the same with hardening agents, e. g. hexamethylenetetramine. The dehydration product produced as shown by the above equation may be designated as dihydroxy diphenyl para hydroxy furfural.

It should be fully appreciated that the quantity of water evolved as shown in example 1 is greatly in excess of that physically contained in the sugar employed (meaning free water plus water of crystallization) and also greatly in excess of the sum of such physically retained water and the maximum amount of water that could possibly be conceived as being produced by the condensation of the phenol with the hexose, as such. The quantity of phenol combined or retained as shown in example 1 is 436 grams or 4.63 mols. Even if, as is extremely improbable, the phenol condensed with the sugar with the production of 4.63 mols. of water (or 83.3 grams of water) i. e. each phenol molecule condensing with a hydroxyl group of the sugar, then the total amount of water evolved would be 83.3 grams plus 55 grams=138.3 grams. But 220 grams of water were actually obtained.

It follows that much of the water produced is obtained by a splitting off of water from the hexose molecule and that, therefore, the resinous body produced comprises a combination of the anhydrous product of the hexose combined with phenol.

The present invention is especially concerned with the production of resinous material which while initially fusible, may be rendered infusible by the use of heat or hardening agents or both, particularly in the presence of wood fibre or other suitable cellulosic or other fibre or loading substance, so that composite material comprising resin, fibre and hardening agent may be subjected to heat and pressure, as in a mold, whereby such material may be compressed and become hardened and yield hard, inert objects of technical utility in the mechanical, electrical and other arts.

Fusible resin prepared as above described may readily be hardened by incorporating suitable hardening agents therewith and applying heat. From 3 to 10 per cent of hexamethylenetetramine may be used to harden a resin prepared in the manner described, when heated with the same, as for example, to a temperature of about 140° C.

The following account will demonstrate the use of the above resin in preparing a compound suitable for molding purposes:

500 grams of the resin was ground in a ball mill with 4% (20 g.) of hexamethylenetetramine and 610 grams of dried ground wood fibre. The resulting composite powder was then further treated by thorough working on differential rolls heated to about 80° C., whereby the wood fibre became impregnated with the fusible resin and hardening agent. The resulting composite material was then ground to a coarse powder. Portions of the latter were placed in a steel mold and compressed therein at a temperature of about 170° C., this treatment lasting five minutes, and resulting in the production of a black, hard, inert, infusible, shaped mass, which possessed a transverse breaking strength of 6440 pounds per square inch.

It will be observed that the proportion of catalyst (sulphuric acid) employed as shown in example 1, was 0.833% of the weight of the phenol employed. If a smaller amount of the catalyst is used the reaction will be slow and apparently less complete. If the proportion be increased so as as to be above 2.5 or 3 per cent of the weight of the phenol, and the proportions as between phenol and carbohydrate are as above stated the reaction proceeds too rapidly and the resinous residue rapidly becomes so viscous as to prevent the complete removal of water. Consequently, from a commercial point of view, the process is much more difficult of control when such larger proportions of concentrated sulphuric acid are employed, but is readily controlled when the proportion of concentrated sulphuric acid is limited as, for example, in the manner shown in example 1.

Instead of sulphuric acid, other catalysts may be employed. Such catalysts are not limited to acidic substances and may comprise amines or other basic bodies, as for example, aniline, the naphthylamines and their homologues, the phenylene diamines, thiocarbanilide, ammonium chloride, hexamethylenetetramine, sodium or potassium hydroxide, sodium alcoholate, anhydro formaldehyde aniline, furfural, and ammonia.

Furthermore, combinations of such basic and acid catalysts may be employed as, for example, aniline in conjunction with sulphuric or other mineral or organic acids, such as hydrochloric acid, phosphoric acid, boric acid, chromic acid, stearic acid, oxalic acid, abietic acid, stannic acid.

The word "catalyst" as herein employed has a broader meaning than corresponds to the strict chemical use of the term. It may function as a true catalyst, that is, remain not permanently altered; or it may be altered and may or may not form a part of the final product. Whereas, the strong mineral acids (as for example sulphuric acid) must be limited to very small proportions as shown, some of the organic catalysts, as for example aniline, may be employed in large proportion and form a substantial part of the final resin.

The following example is given to illustrate the applicability of the basic or amine type of catalyst or reaction-promoting agent.

*Example 2.*—The same column still was used as described in example 1.

700 grams of phenol and 100 grams of aniline were placed in the still, heated to 125° C. and 500 grams of Argo corn sugar gradually added. Heating was continued until solution of the sugar and ebullition of the mass occurred. Due to rapid production and elimination of water, further heating caused the temperature of the reacting bodies to rise, in one hour, to 169° C. at which point 204 cc. of aqueous distillate and 45 cc. of oily distillate (phenol and water) were collected. The residue comprised a resinous substance and free phenol. It was cooled to 70° C. and 60 grams hexamethylenetetramine added and dissolved and heating and distillation resumed. The temperature rapidly rose to 148° C. and was then carried up to 176° C. This second distillation occupied two hours, and during this period 30 cc. of ammoniacal distillate was collected. At the close of this distillation the evolution of aqueous material had practically ceased. It will be observed that the hexamethylenetetramine or possibly the ammonia (in dry form) associated therewith acted as a dehydrating agent and caused the evolution as stated of 30 cc. of aqueous distillate.

A partial vacuum was then applied to the contents of the still and vacuum distillation continued until no more phenol distilled at a temperature of 150° C. and twenty-seven inches of vacuum. At this temperature the residue in the still was a thick, viscous, dark brown resinous mass, which upon cooling, solidified to a brittle solid. Unlike the product produced as in example 1, it was not completely soluble in alcohol.

This resin was hardened very slowly by heating to about 150° C. with 1% of hexamethylenetetramine, or 8% of anhydro formaldehyde aniline; but by heating with a mixture of these hardening agents in the same respective proportions, rapid hardening (infusibility) developed. This demonstrates the novelty of employing mixtures of a methylene amine with other bodies of an aldehydic character. The same thing is true of furfural. Alone it seems to have little effect on the resins described, but in the presence of hexamethylenetetramine, the activity of the combination is surprising.

The resin prepared as above described, when incorporated with ground wood fibre in the proportion of 60 parts of the latter to 50 parts of the former, and with a hardening agent consisting of 10% of anhydro formaldehyde aniline and 1% of hexamethylenetetramine (based on the weight of resin), yielded a composite molding material, which was ground to a coarse powder. When molded under pressure at a temperature of about 170° C. this composite material changed to a hard, dark brown, infusible, inert, shaped mass, possessing a transverse breaking strength of 5900 pounds per square inch.

Instead of mechanically incorporating the resin with wood fibre or with mineral fillers, it may be dissolved in a solvent, as for example, ethyl alcohol, methyl alcohol, or mixtures of these with acetone or other suitable solvent, whereby a varnish is obtained. The wood fibre or mineral fillers may then be mixed with the varnish, with or without the addition of hardening agents and the solvent evaporated, all as is known to those skilled in the art. Instead of wood fibre, other fibrous material may be employed. The fibrous material may be in comminuted or sheet form, depending on whether the product is to be a molding powder or stock for the preparation of laminated articles.

Instead of employing more than one amine or base as shown in example 2, a single amine may be used as shown in the following example:

*Example 3.*—The same type of apparatus was employed. 120 grams aniline, 550 grams phenol and 10 grams stearic acid were placed in the still and heated to 130° C. 500 grams of crude dextrose (Argo corn sugar) were then added and heated until solution took place. Heating was continued and ebullition occurred at 120° C. Distillation and water elimination were then proceeded with, so that the temperature rose to 170° C. in one hour and to 183° C. in the next two and one-half hours, at the end of which time the evolution of water had become very slow and dehydration of the reacting bodies and the splitting off of water from the carbohydrate was substantially complete.

The residue in the flask comprised a dark colored resinous body and free phenol. Vacuum distillation was then employed to remove the latter and 290 grams of phenol were thus recovered, showing that 260 grams had combined or been retained. The residue in the flask, on cooling, was a brittle anhydrous resin. The total amount of water evolved was 229 grams. 3.09 mols. (290 grams) of phenol were retained and if, as is extremely unlikely, each molecule of phenol condensed with a hydroxyl group from the dextrose, with the elimination of a molecule of water, then 3.09 mols. of water, or 55.6 grams of water would have been produced. On the other hand, it is highly probable that the aniline condensed with the terminal, or aldehydic oxygen of the dextrose to form the well known dextrose anilide. Since 100 grams (1.075 mols.) of aniline were combined, 1.075 mols. (19.4 grams) of water may be accounted for thus; and 55 grams of water are accounted for by the 11% of physically retained water in the crude dextrose employed. The sum of these several quantities of water equals 130 grams. Actually 229 grams of water were obtained in the experiment disclosed. It follows, therefore, that the sugar molecule itself suffered a loss of water.

It is thus shown that either acid or basic catalysts or auxiliary reacting bodies, may be employed to effect the splitting off of water from a monose, e. g. dextrose or a dextrose-yielding carbohydrate in the presence of a phenol, whereby a substantially anhydrous resin may be produced.

Or both basic and acid catalysts may be used, simultaneously or in sequence. For example, aniline and sulphuric acid may be simultaneously employed, either in the ratio corresponding to aniline sulphate, or otherwise, for example, with an excess of aniline over that necessary to form aniline sulphate.

The following example will illustrate how an acid and an amine may be employed in sequence:

*Example 4.*—The same type of apparatus was employed as in the previous examples described.

600 grams phenol and 5 grams sulphuric acid were placed in the still and heated to 130° C. 500 grams of Argo corn sugar were then added and dissolved and the mixture distilled to a temperature of 180° C. during the first hour and a half and held at this temperature for another hour or until the evolution of water was very slow, showing that the resinous residue in the still was substantially anhydrous. 220 cc. of aqueous distillate were collected. The residue in the flask was a resinous mass containing free phenol. It was cooled to 90° C., 300 grams of phenol were added and then 60 grams hexamethylenetetramine. Heating was again resumed. At about 115° C. a very vigorous reaction set in, with liberation of ammonia and violent foaming. Upon cooling a black, brittle resin was obtained.

In another experiment similar to the above the same total quantity of phenol (900 grams) was used, the difference being that this quantity was employed from the beginning, instead of being used in 600 and 300 gram portions. The reaction with the acid catalyst was continued until 195 cc. of aqueous distillate were collected, the reaction mixture cooled, hexamethylenetetramine added and distillation resumed until 30 cc. ammoniacal distillate were produced. The resinous residue was then subjected to vacuum distillation and 185 grams of phenolic distillate distilled. On cooling, a solid, brittle resin was obtained weighing 1005 grams. It was substantially soluble in alcohol, and, like the other products of the present invention, capable of slow hardening by heating, or rapid hardening by heating with suitable hardening agents, e. g. hexamethylenetetramine, or mixtures of the same with other hardeners as, for example, furfural or anhydro formaldehyde aniline.

It will be observed that in the preferred form of the invention, the phenol employed is used in a greater proportion during the dehydrating reaction than is finally combined or retained and that such excess may be removed as for example, by vacuum distillation, prior to incorporating the resin so produced with hardening and other materials.

The use of such excess is connected with the preferred method of effecting the water elimination. This preferred method comprises, as shown, the use of heating or distillation and the further use of comparatively high temperatures. Such high temperatures tend to cause hardening of the resinous body and such hardening, which is accompanied by increase in viscosity of the melted resinous body, is preferably held in abeyance until the evolution of water is completed, i. e. until the distillation of water has become very slow. In other words, the viscosity of the bodies undergoing water elimination is preferably maintained at a low value so that boiling and water elimination may proceed smoothly. An excess of phenolic body acts as a solvent for the other reacting substances and offers a convenient means for keeping the reacting bodies in a relatively limpid condition until the desired quantity of water is eliminated. Other means for effecting this object may be employed, as, for example, the use of solvents for the resinous bodies, other than a phenol, such as naphthol, acetanilide or nitrobenzol. Such solvent should preferably be one capable of subsequent removal, as by distillation, unless it is desired to allow such solvent to remain.

When a phenol is employed, in excess, as described, it is probable that such excess assists in carrying the reaction to completion, although as stated, the primary object of employing such excess of phenol, or other solvent, is to maintain the reacting bodies in such a state of "fluidity", or low viscosity, that the removal of water by distillation may be facilitated and a more complete elimination of water from such bodies be effected.

To recapitulate the invention in concise terms it comprises processes for splitting off water from carbohydrates, preferably hexoses, in the presence of phenolic bodies, by means of dehydrating or catalytic agents, whereby substantially anhydrous resinous bodies are produced. By this term is meant resinous bodies which do not give off water in substantial amounts when molded at usual molding temperatures, approximately 130° C. to 190° C. The invention further comprises producing hard, shaped masses from such bodies by heating the same, particularly in the presence of so-called "fillers", and especially fibrous material with or without hardening agents, such as hexamethylenetetramine, trioxymethylene, para formaldehyde, anhydro formaldehyde aniline, and furfural.

As dehydrating agents, sulphuric acid, aniline and hexamethylenetetramine (or dry ammonia) have been illustrated in examples, and others have been disclosed, such agents being employed in conjunction with heat to effect the desired elimination of water. It is conceivable that means other than those actually disclosed specifically, might be employed to secure equivalent action and the present invention is broad enough to cover any and all means for splitting off water from a suitable carbohydrate in the presence of a phenol (or equivalent substance) so as to obtain a substantially anhydrous resin.

In one form of the present invention water may be split off from the carbohydrate prior to its reaction with a phenol and such products then reacted with said phenol.

In any case, the desired product is one that comprises a combination of a phenol (or equivalent) with a carbohydrate from which water has been split off.

One method that may be employed for splitting off water from a monose prior to reaction with a phenol comprises heating such monose with aniline. The anilide first forms and has been found then to decompose with evolution of water and production of the decomposition products of the monose combined with aniline. Such a product may then be reacted with a phenol to produce a substantially anhydrous resin.

This is illustrated by the following example:

*Example 5.*—643 grams of Argo corn sugar were dissolved in 279 grams of aniline and the solution distilled to a temperature of 140° C. 160 cc. of aqueous distillate were obtained and the residue was a resinous mass comprising decomposition products of dextrose-anilide.

374 grams of this resinous residue was then treated with 225 grams of phenol and distillation again employed whereby 54 cc. of aqueous distillate were produced. The residue was then submitted to vacuum distillation and 110 grams of phenolic oil removed. The final residue, on cooling, was a solid, brittle, fusible resin. It was capable of being hardened by hardening agents, including trioxymethylene, or a mixture of the same with oxalic acid.

In addition to the evolution of water, as herein described, small quantities of carbon dioxide and formic acid, as for example from one to two per cent of the weight of carbohydrate, may be evolved.

The water physically contained in a carbohydrate means, not only water present as moisture but also water of crystallization or hydration in the case of crystallized products. For example, dextrose crystallizes with one molecule of water of crystallization according to the formula $C_6H_{12}O_6 \cdot H_2O$.

Wood fibre, or other cellulosic fibre, is ordinarily with other resins, looked upon merely as a mechanical filler. In the case of resins made from carbohydrates, it has, however, been found and it is herewith disclosed, that wood or cellulose fibre may be employed in a hardening capacity. By heating a resin, made as herein disclosed, with, for example, ground wood fibre, the resulting composition may have a decidedly higher resistance to heat, and mechanical strains, than the original resinous substance. Such hardening action may be due to the similarity in nature between the resinifying agent initially used, e. g. a hexose, and the wood fibre subsequently employed in a hardening and filling capacity.

As has been pointed out, an excess of phenolic substance is herein preferably used, when reacting with a carbohydrate, e. g., a monose, to produce a fusible resin, or one which is only slowly hardened by heating.

In other words, if the proportion of carbohydrate is too high with respect to phenol, a resin may be produced which hardens too quickly while being made.

The reason for the hardening action of wood or cellulose fibre on carbohydrate resins may be explained by reasoning that such fibre, which is itself a carbohydrate, acts to provide an excess of carbohydrate over phenolic constituent.

Such hardening action appears to be specific for carbohydrate resins and not to apply to other resins.

It is possible to carry on the reactions referred to herein without the use of a catalyst although, so far as I am aware, the use of a catalyst is very desirable. Without the catalyst the reaction is slow and not as complete. The following is an example of the reaction without the catalyst:

*Example 6.*—500 grams of Argo corn sugar and 500 grams of phenol were heated together in a column still as above described, and subjected to distillation therein. Water was eliminated and the temperature gradually raised during four hours to 179° C. At the end of four and three-quarters hours the temperature was about 178° C., this temperature referring to the reaction mixture containing the reacting bodies. About 150 grams of water were eliminated. Vacuum distillation was then employed to remove excess phenol. About 354 grams of phenol were recovered in this way showing that about 146 grams had been retained. The weight of the residue in the still was 490 grams.

The water elimination was much less than in similar cases where a catalyst was used. The residue comprised resinous, i. e. water insoluble and also water soluble material. Since 146 grams or 1.55 mols. of phenol were retained, 1.55×18 or 27.9 grams of water might be attributed to condensation of phenol and sugar. This plus the 55 grams of "moisture" in the sugar equals 82.9 grams of water. Since about 150 grams of water were recovered, it is to be concluded that here also the sugar suffered a splitting off of water.

I do not claim herein, specifically, the use of aniline or basic catalysts, as such are claimed in my copending applications filed February 6, 1924, and January 22, 1925, Serial Numbers 617,399 and 4,117 respectively; nor do I claim specifically herein the use of furfural or anhydro formaldehyde aniline as hardening agents as these agents are claimed in my copending application filed March 3, 1926, Serial Number 92,640.

I claim:—

1. A resin forming process which comprises reacting a monose or monose-yielding carbohydrate with a phenol to eliminate water in quantity exceeding that physically contained in the ingredients and that attributable to their condensation with each other, to form a substantially anhydrous resinous product.

2. A resin forming process which comprises reacting a monose or monose-yielding carbohydrate with a phenol to eliminate water in quantity exceeding that physically contained in the ingredients and that attributable to their condensation with each other, to form a substantially anhydrous resinous product, and heating the resinous product with a hardening agent to make it infusible.

3. A resin forming process which comprises reacting a monose or monose-yielding carbohydrate with a phenol, in excess of that retained in the resin, to eliminate water in quantity exceeding that physically contained in the ingredients and that attributable to their condensation with each other, to form a substantially anhydrous resinous product.

4. A resin forming process which comprises heating to substantially over 100° C. a monose or monose-yielding carbohydrate and a phenol to eliminate water in quantity exceeding that physically contained in the ingredients and that attributable to their condensation with each other to form a substantially anhydrous resinous product.

5. A resin forming process which comprises reacting a monose or monose-yielding carbohydrate with a phenol, and sulphuric acid in amount not exceeding three percent by weight of the total phenol used, to eliminate water in quantity exceeding that physically contained in the ingredients and that attributable to their condensation with each other to form a substantially anhydrous resinous mass.

6. A resin forming process which comprises reacting a monose or monose-yielding carbohydrate with a phenol, and sulphuric acid in amount not less than 0.8 percent and not more than three percent by weight of the total phenol used, to eliminate water in quantity exceeding that physically contained in the ingredients and that attributable to their condensation with each other, to form a substantially anhydrous resinous product.

7. A resin forming process which comprises reacting dextrose or a dextrose-yielding carbohydrate with a phenol to eliminate water in quantity exceeding that physically contained in the ingredients and that attributable to their condensation with each other to form a substantially anhydrous resinous product.

8. A resin forming process which comprises reacting dextrose or a dextrose-yielding carbohydrate with a phenol to eliminate water in quantity exceeding that physically contained in the ingredients and that attributable to their condensation with each other to form a substantially anhydrous resinous product, and heating the resinous product with a hardening agent to make it infusible.

9. A resin forming process which comprises reacting dextrose or a dextrose-yielding carbohydrate with a phenol in excess of that retained in the resin, to eliminate water in quantity exceeding that physically contained in the ingredients and that attributable to their condensation with each other to form a substantially anhydrous resinous product.

10. A resin forming process which comprises heating to substantially over 100° C. dextrose or a dextrose-yielding carbohydrate and phenol to eliminate water in quantity exceeding that physically contained in the ingredients and that attributable to their condensation with each other, to form a substantially anhydrous resinous product.

11. A resin forming process which comprises reacting dextrose or a dextrose-yielding carbohydrate with a phenol and sulphuric acid in amount not greater than three percent by weight of the total phenol used, to eliminate water in quantity exceeding that physically contained in the ingredients and that attributable to their condensation with each other to form a substantially anhydrous resinous product.

12. A resin forming process which comprises reacting dextrose or a dextrose-yielding carbohydrate with a phenol and sulphuric acid, in amount not less than 0.8 percent nor more than three percent of the weight of the total phenol used, to eliminate water in quantity exceeding that physically contained in the ingredients and that attributable to their condensation with each other to form a substantially anhydrous resinous product.

13. A resin forming process which comprises distilling dextrose of a dextrose-yielding carbohydrate, a phenol and a catalyst, to dehydrate the material and split off and eliminate water from the carbohydrate molecule.

14. A substantially anhydrous resinous reaction product of a dehydrated hexose or hexose-yielding carbohydrate, from which water has been split off, and a phenol.

15. A substantially anhydrous resinous reaction product of a dehydrated hexose or hexose-yielding carbohydrate, from which water has been split off, a phenol and a hardening agent.

16. A substantially anhydrous resinous reaction product of a dehydrated hexose or hexose-yielding carbohydrate, from which water has been split off, a phenol, a catalyzer and a hardening agent.

17. A substantially anhydrous resinous reaction product of a dehydrated hexose or hexose-yielding carbohydrate, from which water has been split off, a phenol, sulphuric acid in amount between 0.8 percent and three percent of the total weight of phenol used, and a hardening agent.

18. A substantially anhydrous resinous reaction product of dehydrated dextrose, or a dextrose-yielding carbohydrate, from which water has been split off, and a phenol.

19. A substantially anhydrous resinous reaction product of dehydrated dextrose, or a dextrose-yielding carbohydrate, from which water has been split off, a phenol, and a catalyzer.

20. A substantially anhydrous resinous reaction product of dehydrated dextrose, or a dextrose-yielding carbohydrate, from which water has been split off, a phenol, a catalyzer, and a hardening agent.

21. A substantially anhydrous resinous reaction product of dehydrated dextrose, or a dextrose-yielding carbohydrate, from which water has been split off, a phenol, sulphuric acid between 0.8 percent and three percent of the total weight of phenol used, and a hardening agent.

JOSEPH V. MEIGS.